US005467527A

United States Patent [19]

Zanini et al.

[11] Patent Number: 5,467,527

[45] Date of Patent: Nov. 21, 1995

[54] CAPPING UNIT FOR AUTOMATICALLY ASSEMBLING PUMP-OPERATED SPRAY CAP

[75] Inventors: Gianpietro Zanini, Montanara; Renzo Vesentini; Carlo Corniani, both of Marmirolo, all of Italy

[73] Assignee: Azionaria Costruzioni Macchine Automatiche A.C.M.A. S.p.A., Bologna, Italy

[21] Appl. No.: 280,783

[22] Filed: Jul. 26, 1994

[30] Foreign Application Priority Data

Jul. 28, 1993 [IT] Italy ................................ BO93A0333

[51] Int. Cl.[6] .................................................. B23P 21/00

[52] U.S. Cl. ................................ 29/773; 29/785; 29/787; 29/240; 53/133.2; 53/331.5

[58] Field of Search ............................ 29/771, 773, 776, 29/783, 785, 786, 787, 791, 792, 793, 794, 795, 801, 809, 240, 281.4, 281.5; 53/133.2, 306, 317, 331.5, 367, 490, 470

[56] References Cited

U.S. PATENT DOCUMENTS 4,232,499 11/1980 Holstein ................................ 53/331.5
5,207,048 5/1993 Wysocki ................................ 53/133.2

FOREIGN PATENT DOCUMENTS

0521581A1 1/1993 European Pat. Off. .
559946 9/1993 European Pat. Off. .............. 53/331.5

*Primary Examiner*—David P. Bryant
*Attorney, Agent, or Firm*—Christensen O'Connor Johnson & Kindness

[57] ABSTRACT

A capping unit wherein a number of capping heads, movable with a supporting carrousel conveyor about a first axis, are each rotated about a respective second axis by a respective first shaft movable axially on the carrousel conveyor, for moving the respective head to and from a respective container movable with the carrousel conveyor and coaxial with the second axis. Each head provides for closing the respective container with a cap presenting an internally threaded ring nut mounted for rotation on a pump-operated nozzle, and presents a first and second gripping device for respectively gripping the nozzle and the ring nut and controlled by a second shaft movable axially in relation to the first shaft. The first gripping device is angularly fixed in relation to the carrousel conveyor, whereas the second gripping device rotates with the capping head about the second axis.

17 Claims, 7 Drawing Sheets

CAPPING UNIT FOR AUTOMATICALLY ASSEMBLING PUMP-OPERATED SPRAY CAP

BACKGROUND OF THE INVENTION

The present invention relates to a capping unit for automatically assembling pump-operated spray cap bottles.

Here and hereinafter, the term "pump-operated spray cap bottle" is intended to mean a bottle comprising a container with an externally threaded neck; and a pump-operated cap defined by an internally threaded cup-shaped ring nut connected releasably to the threaded neck of the container and in rotary and axially fixed manner to a pump body presenting, on one side, a suction tube extending inside the container, and, on the other, a nozzle projecting axially outwards of the ring nut and substantially consisting of a hand-operated piston with a lateral ejector.

SUMMARY OF THE INVENTION

It is an object of the present invention to provide a relatively low-cost, reliable capping unit for automatically connecting the container and cap of pump-operated spray cap bottles.

More specifically, it is an object of the present invention to provide a capping unit designed to positively engage both the nozzle and ring nut of the pump-operated cap of a pump-operated spray cap bottle, and which provides, in a straightforward, reliable manner, for rotating the ring nut in relation to the nozzle and so screwing the ring nut on to the threaded neck of the container.

It is a further object of the present invention to provide a capping unit designed to rotate the ring nut without ruining it.

According to the present invention, there is provided a capping unit for automatically assembling pump-operated spray cap bottles comprising a container with an externally threaded neck, and a pump-operated cap presenting a nozzle and an internally threaded ring nut fitted to the nozzle so as to rotate about a first axis; the unit comprising a capping head in turn comprising first and second engaging means movable to and from respective positions wherein they respectively engage said ring nut and the respective said nozzle, for rotating the ring nut about the first axis and in relation to the nozzle; characterized in that said first engaging means comprise a gripping device coaxial with the first axis and movable to and from said position engaging said ring nut; the capping head comprising a first shaft coaxial with and rotating about the first axis; a first drive interposed between the first shaft and said first engaging means, for rotating the first engaging means continuously about the first axis; a second shaft movable axially in relation to the first shaft; and a second drive controlled by the second shaft, for moving both said engaging means to and from the respective said engagement positions.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
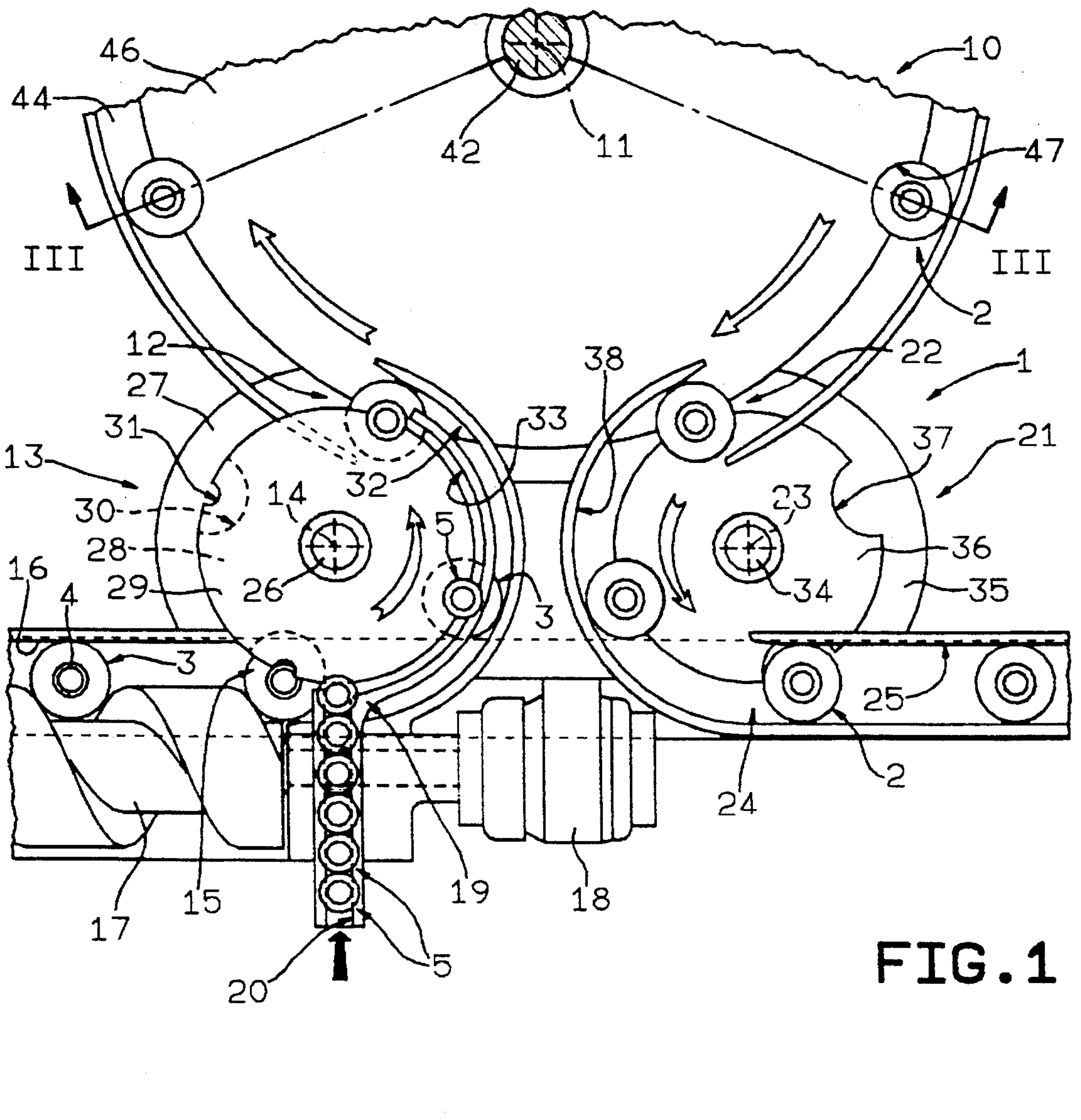
FIG. 1 shows a partial schematic plan view of a preferred embodiment of the capping unit according to the present invention.

Number 1 in FIG. 1 indicates a capping unit for pump-operated spray cap bottles.

Figure 2:
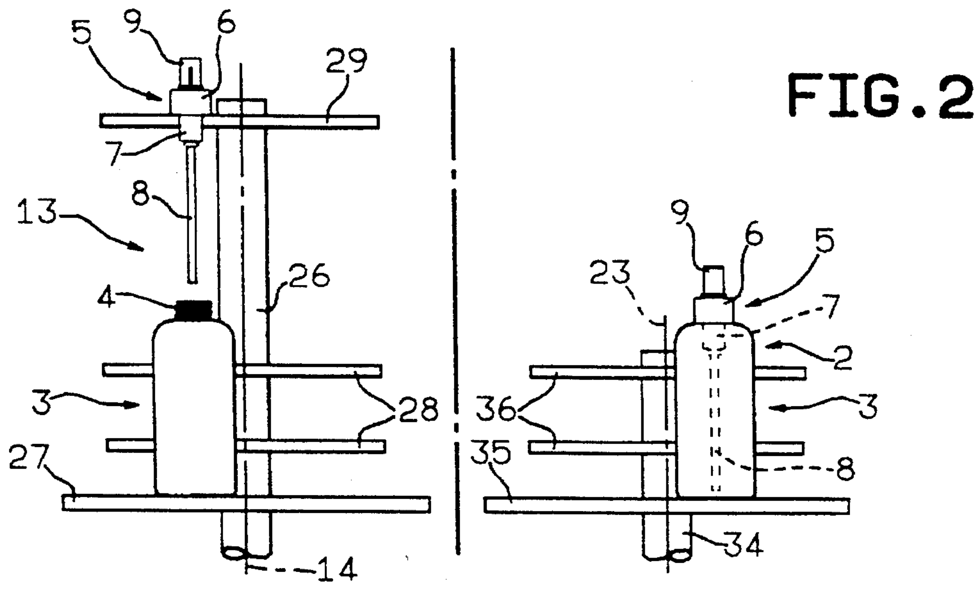
FIG. 2 shows a partially sectioned side view, with parts removed for clarity, of a detail in FIG. 1.

As shown in FIG. 2, each bottle 2 comprises a container 3 with an externally threaded neck 4; and a cap 5 in turn comprising a cup-shaped ring nut 6 with an internal thread for releasable connection to neck 4 of container 3 and connected in rotary and axially fixed manner to a pump body 7 presenting, on one side, a suction tube 8 extending inside container 3, and, on the other, a nozzle 9 projecting axially outwards of ring nut 6 and substantially consisting of a hand-operated piston with a lateral ejector (not shown).

With reference to FIG. 1, unit 1 comprises a main carrousel conveyor 10 mounted to rotate clockwise (in FIG. 1) about a vertical axis 11, and which, at a first transfer station 12, is supplied by a rotary input conveyor 13 with a succession of containers 3 and a separate succession of caps 5. Conveyor 13 rotates anticlockwise (in FIG. 1) about an axis 14 parallel to axis 11, and is supplied at a first input station 15 with a succession of containers 3 from a horizontal input conduit 16 presenting a screw feeder 17 driven by a motor 18 and which provides for feeding containers 3 in steps to station 15. Conveyor 13 is also supplied at a second input station 19 with a succession of caps 5 from a horizontal conduit 20 perpendicular to conduit 16.

Conveyor 10 provides for assembling caps 5 on to respective containers 3, and feeding the assembled bottles 2 to a rotary output conveyor 21 via a second transfer station 22. Conveyor 21 rotates anticlockwise (in FIG. 1) about an axis 23 parallel to axis 11, to transfer bottles 2 from station 22 to an output station 24 and into an output conduit 25 aligned with conduit 16.

Figure 3:
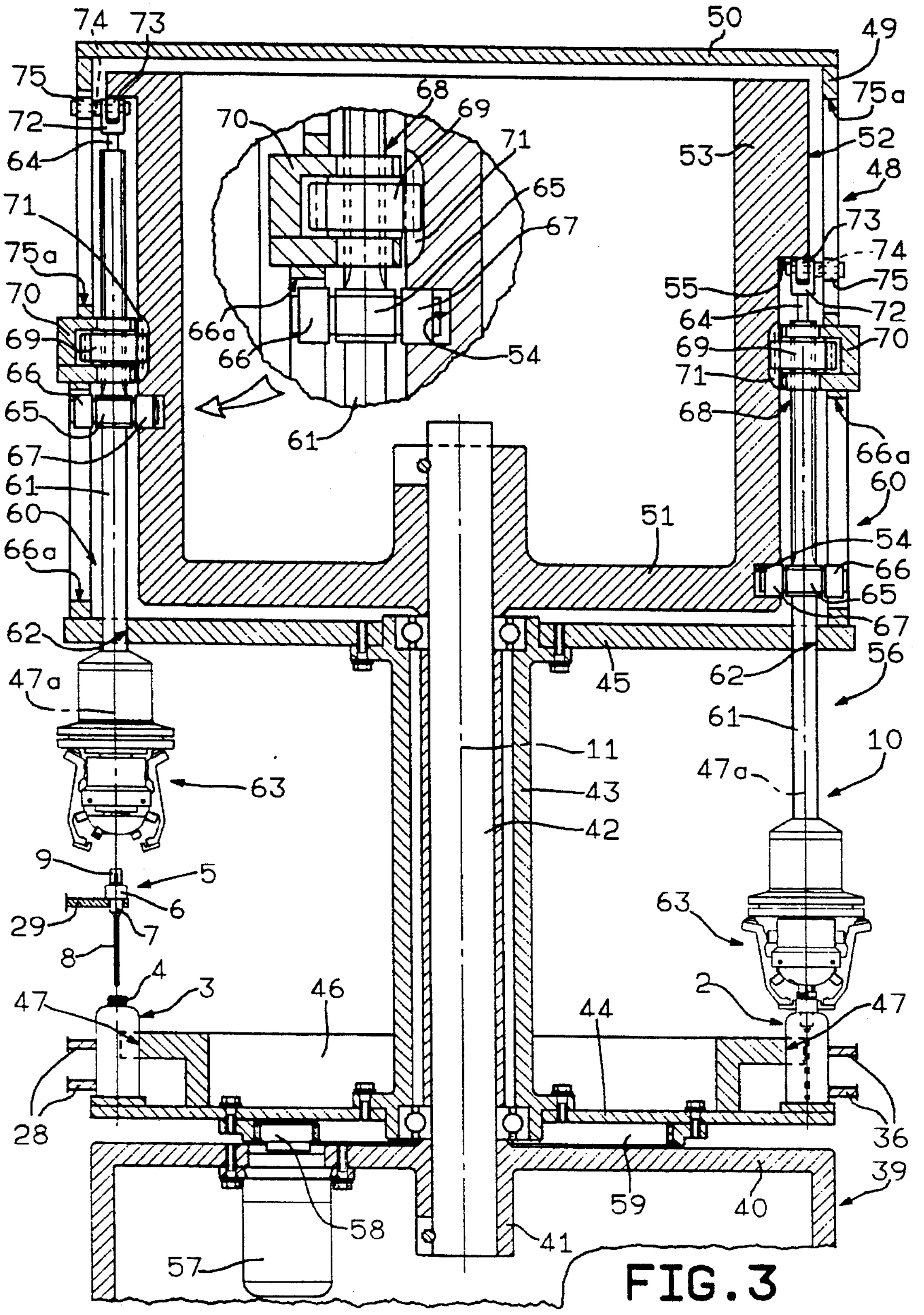
FIG. 3 shows a larger-scale section along line III—III in FIG. 1.

With reference to FIGS. 1 to 3, conveyor 13 comprises a shaft 26 coaxial with axis 14 and fitted with a bottom platform 27, a pair of intermediate disks 28 and a top disk 29. Disks 28 present an orderly succession of peripheral seats 30 for partially receiving respective containers 3 supported on platform 27; while disk 29 presents an orderly succession of seats 31 coaxial with respective seats 30, and each receiving the pump body 7 of a respective cap 5 positioned with ring nut 6 resting on disk 29. Conveyor 13 also comprises a first and second outer guide defining, with the outer periphery of disks 28 and 29, respective channels 32 and 33 for respectively feeding containers 3 and caps 5 from respective input stations 15 and 19 to station 12.

Like conveyor 13, conveyor 21 comprises a shaft 34 coaxial with axis 23 and fitted with a bottom platform 35, and a pair of top disks 36 with an orderly succession of peripheral seats 37 for partially receiving respective bottles 2 resting on platform 35. Conveyor 21 also comprises an outer guide defining, with the outer periphery of disks 36, a channel 38 for feeding bottles 2 from station 22 to station 24.

With reference to FIG. 3, carrousel conveyor 10 comprises a base 39, the substantially horizontal top wall 40 of which presents a tubular appendix 41 coaxial with axis 11 and engaged by a fixed shaft 42 extending upwards from base 39 and supporting for rotation, via the interposition of bearings, a tubular body 43 presenting a circular bottom flange 44 and a circular top flange 45. Flange 44 constitutes a supporting platform for containers 3, and is fitted on its top surface with a disk 46 coaxial with axis 11 and presenting a succession of peripheral seats 47 similar to seats 30 and 37, and the respective axes 47*a* of which are arranged about axis 11 with the same spacing as seats 30 and 37.

Flange 45 constitutes the bottom wall of a cylindrical housing 48 comprising a cylindrical lateral wall 49 extending upwards from the outer periphery of flange 45; and a top cover wall 50 parallel to flange 45. The top end of shaft 42 projects inside housing 48 and is fitted to the bottom wall 51 of a drum cam 52 housed in a fixed position inside housing 48 and presenting a lateral wall 53 in which are formed an annular cam groove 54 and an annular cam shoulder 55 over groove 54 and facing flange 45.

Tubular body 43, flanges 44, 45 and housing 48 constitute a drum 56 mounted for rotation on shaft 42 and rotated clockwise (in FIG. 1) about axis 11 by a motor 57, the output shaft of which extends through wall 40 of base 39 and is fitted with an output pinion 58 meshing with an internally toothed ring gear 59 integral with the bottom surface of flange 44 and coaxial with axis 11.

Each seat 47 is associated with a respective capping assembly 60 coaxial with respective axis 47*a*, supported on cam 52, and connected in axially sliding manner to drum 56 so as to rotate with drum 56 about axis 11.

With reference to FIG. 3, each assembly 60 comprises a tubular guide shaft 61 coaxial with respective axis 47*a* and extending in sliding manner through a respective hole 62 in flange 45; a capping head 63 fitted to the bottom end of shaft 61 and movable with shaft 61 between flanges 44 and 45; and a drive shaft 64 fitted in sliding manner inside shaft 61, with the top end projecting upwards from the top end of shaft 61, and the bottom end engaged inside respective head 63.

More specifically, shaft 61 extends inside housing 48 through respective hole 62, and is fitted in rotary and axially fixed manner with a sleeve 65 presenting two diametrically opposed appendixes supporting respective rollers 66 and 67. Roller 66 is an antirotation roller engaging in a sliding manner an axial opening 66*a* formed through wall 49; and roller 67 is a tappet roller engaging groove 54 so as to move shaft 61 axially in relation to cam 52 and flange 44. By means of a splined joint 68, the portion of shaft 61 above sleeve 65 is fitted with a pinion 69 which is supported in rotary and axially fixed manner by a fork 70 integral with wall 49, and meshes with a ring gear 71 formed on the outer surface of wall 53 of cam 52. The top end of shaft 64 is fitted with a fork 72 supporting a tappet roller 73 which is positioned contacting shoulder 55 and is supported for rotation on a pin 74 extending outwards of fork 72 and supporting for rotation an antirotation roller 75 engaging in a sliding manner an axial opening 75*a* formed through wall 49.

Figure 5:
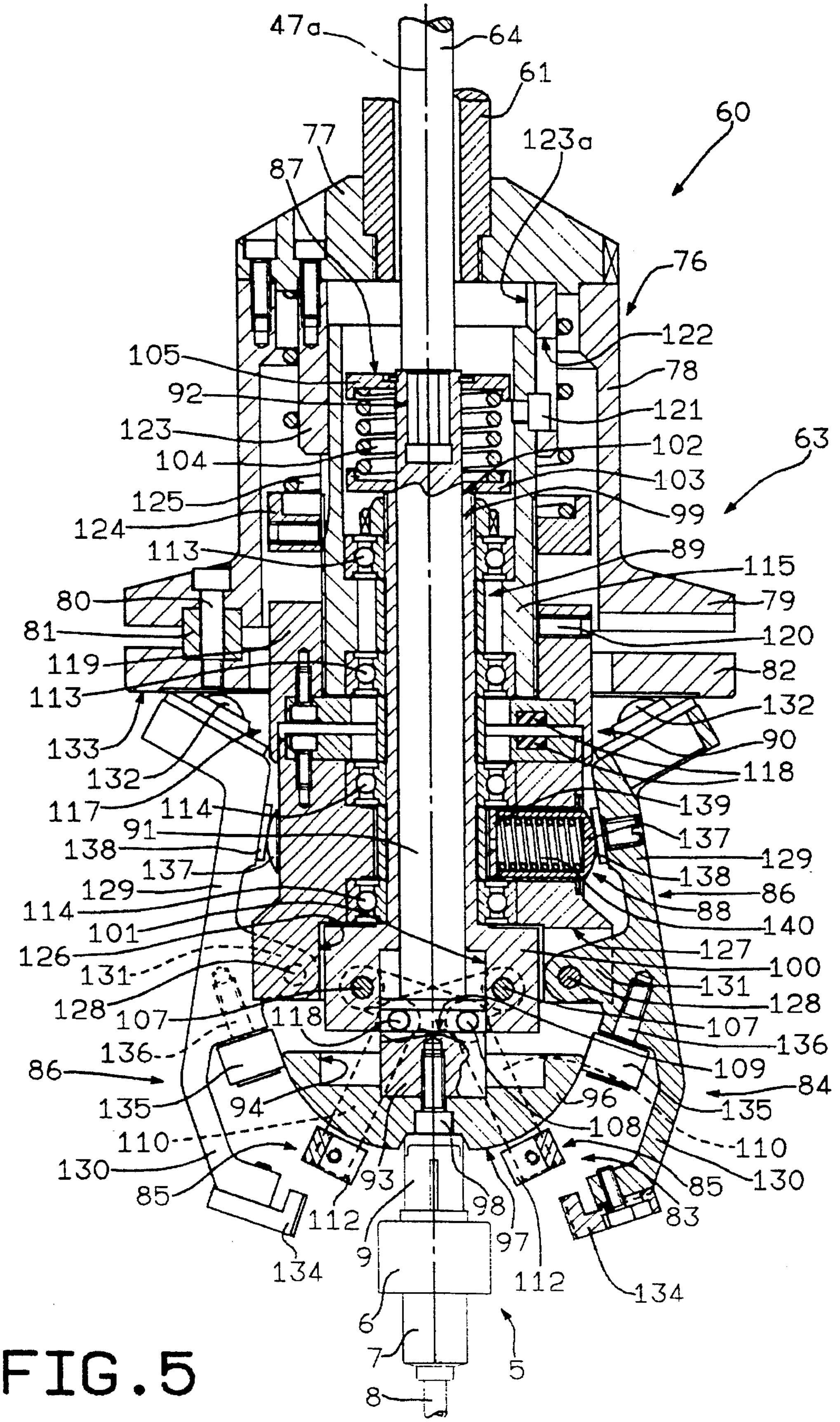
FIG. 5 shows a larger-scale section along line V—V in FIG. 4.
Figure 6:
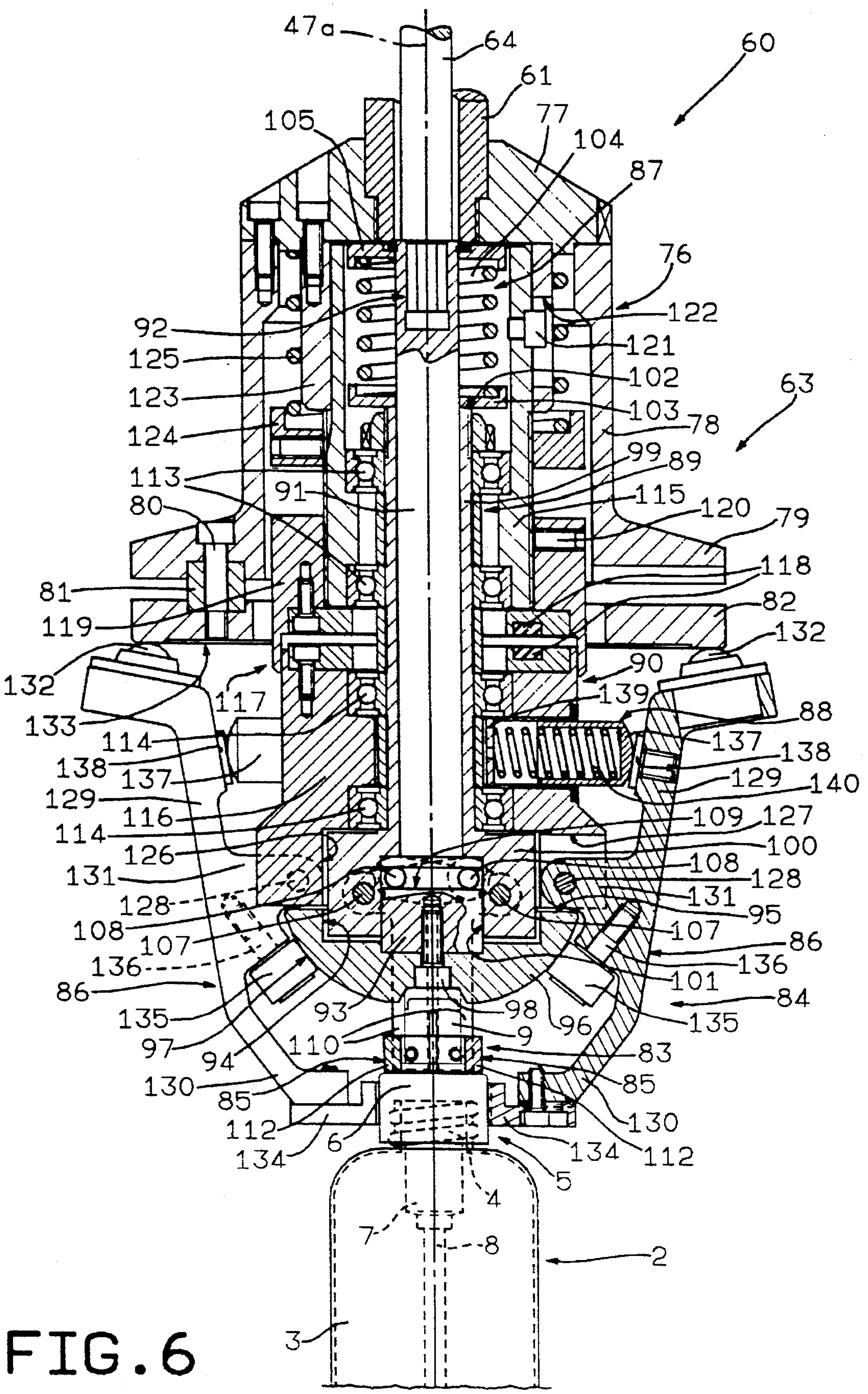
FIG. 6 shows a larger-scale section along line VI—VI in FIG. 4.

As shown in FIGS. 5 and 6, head 63 comprises an upper cylindrical bell 76 with its concavity facing downwards and coaxial with respective axis 47*a*, and in turn comprising an upper transverse wall 77 fitted through with and integral with the bottom end of shaft 61, and a cylindrical lateral wall 78 with an outer annular flange 79 at the bottom end. By means of screws 80 and via the interposition of spacers 81 of resilient material, flange 79 is fitted integral with a face ring 82 coaxial with axis 47*a*.

Head 63 also comprises a first gripping device 83 angularly fixed in relation to conveyor 10, and by which nozzle 9 of a respective cap 5 is engaged and maintained in a given angular position in relation to conveyor 10; and a second gripping device 84 rotating with bell 76 about axis 47*a*, and by which ring nut 6 of a respective cap 5 is engaged, rotated about axis 47*a*, and so screwed on to neck 4 of a respective container 3 to form assembled bottle 2. Gripping devices 83 and 84 respectively comprise two rocker jaws 85 diametrically opposed in relation to axis 47*a*, and three rocker jaws 86 equally spaced about axis 47*a*; and are normally-closed devices which are closed by respective elastic reaction devices 87 and 88 described later on. Jaws 85 and 86 are movable between a closed operating position and an open position in opposition to elastic devices 87 and 88 and by virtue of a drive 89 controlled by drive shaft 64; while device 84 is rotated about axis 47*a* by shaft 61 via the interposition of bell 76 and a drive 90.

Drive 89 comprises a shaft 91 connected to the bottom end of shaft 64 by a splined joint 92 and therefore angularly integral with shaft 64 which is in turn maintained angularly fixed in relation to conveyor 10 by antirotation roller 75. As shown more clearly in FIGS. 7 and 8, the free bottom end of shaft 91 is fitted integral with a head 93 in the form of a rectangular parallelepipedon coaxial with axis 47*a*, and a bottom portion of which is engaged inside a cavity of the same section formed in the bottom of a cylindrical cavity 94 coaxial with axis 47*a*. Cavity 94 is formed in the flat top surface 95 of a wedge or cam body 96 which is defined at the bottom by a spherical cam surface 97, and is fitted to head 93 by means of a screw 98 coaxial with axis 47*a*.

Drive 89 also comprises a tubular body 99 fitted on to shaft 91 and presenting at the bottom end a head 100 defined externally by a cylindrical surface with a diameter approximately equal to but no more than the diameter of cavity 94. Head 100 is fitted through with shaft 91, and presents a downward face cavity 101 in the form of a rectangular parallelepipedon, which is always at least partly engaged in axially sliding and angularly fixed manner by head 93 so as to angularly fix body 99 in relation to conveyor 10 by means of head 93 and shafts 91 and 64. Body 99 terminates at the top in an annular surface 102 constituting a supporting surface for an annular plate 103 mounted in sliding manner on shaft 91 and maintained contacting surface 102 by elastic device 87 which comprises a helical spring 104 coaxial with axis 47*a* and compressed between plate 103 and a further plate 105 fixed to the top end of shaft 91.

Figure 8:
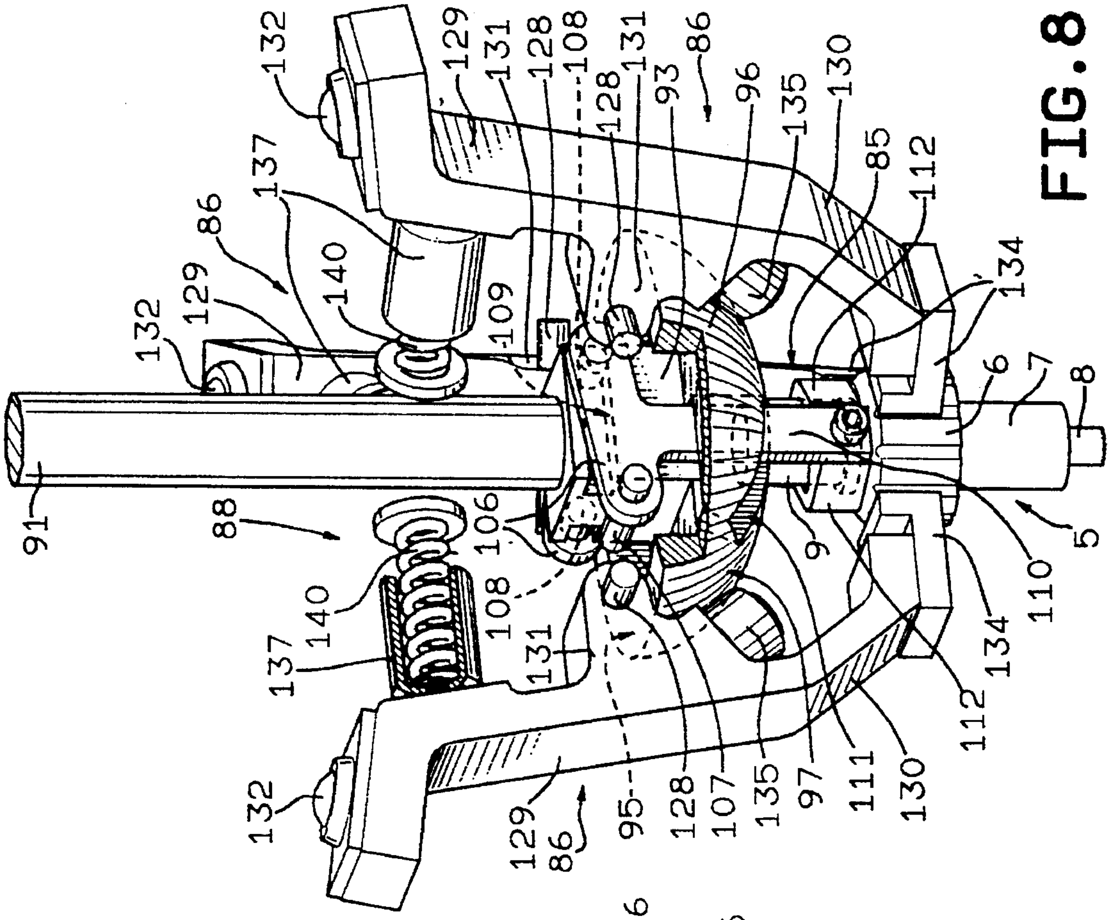
FIG. 8 shows a view in perspective of a detail in FIG. 6.
Figure 7:
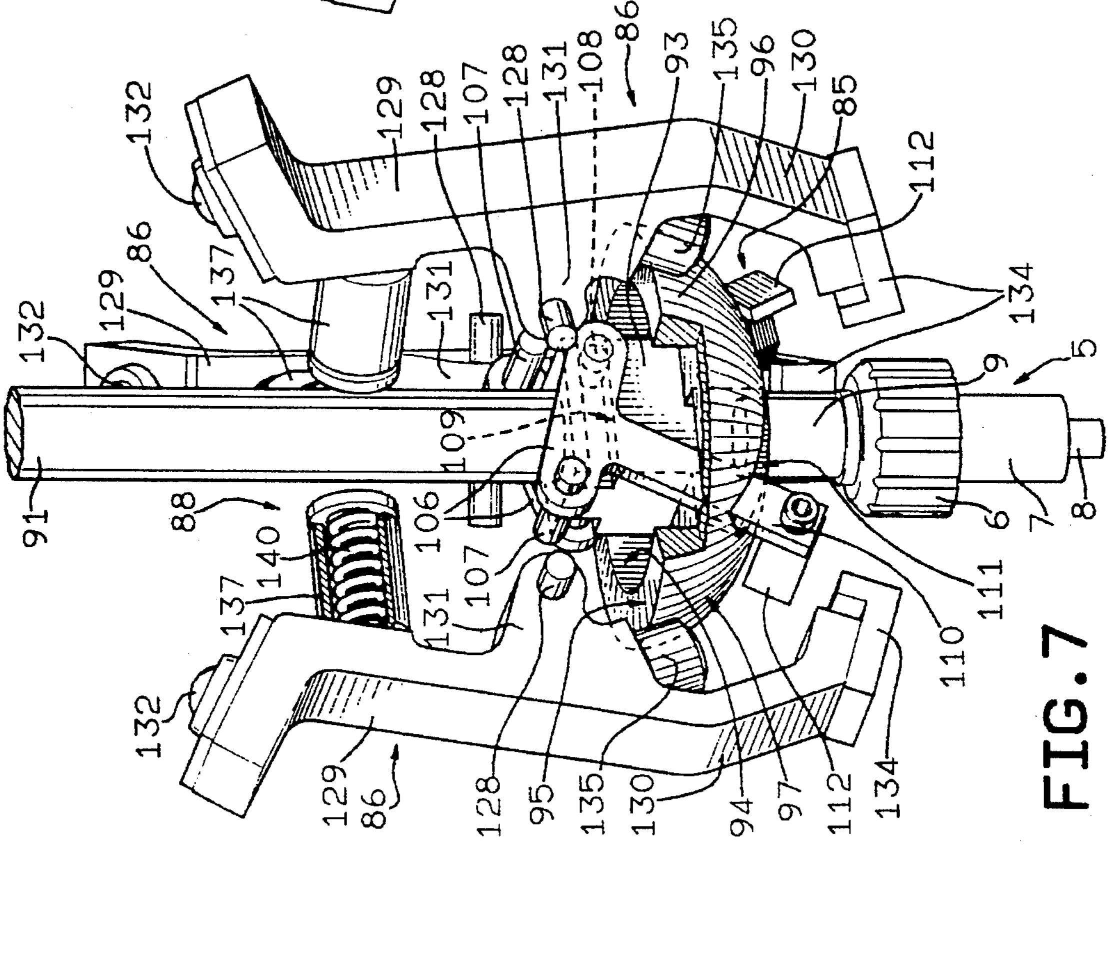
FIG. 7 shows a view in perspective of a detail in FIG. 5.

As shown more clearly in FIGS. 7 and 8, each jaw 85 of gripping device 83 consists of a substantially T-shaped rocker arm housed partially inside a respective opening (not shown) in head 100, and which comprises a first arm 106 pivoting at one end on head 100 about a pin 107 perpendicular to axis 47*a*, and presenting at the other end a pin 108 parallel to pin 107 and fitted in sliding manner inside a groove 109 formed along a material surface of head 93 and perpendicular to axis 47*a* end pins 107 and 108. Each jaw 85 also comprises a second arm 110 extending downwards from an intermediate point of respective arm 106 and engaging in sliding manner both said opening (not shown) in head 100 and a slot 111 formed through body 96. The free bottom end of arm 110 is fitted with an L-shaped gripping element 112 extending transversely to axis 47*a* and defining, with gripping element 112 of the other arm 110, a substantially square-shaped collar for substantially fully enclosing the outer surface of nozzle 9 of cap 5.

Opening and closing of jaws 85 are thus determined by head 93 moving along axis 47*a* and in relation to head 100; and, more specifically, as shown in FIG. 6, further penetration of head 93 inside cavity 101 brings gripping elements 112 towards each other into the closed position.

With reference to FIGS. 5 and 6, drive 90 comprises a first and second pair of bearings 113 and 114 packed, by means of a ring nut and via the interposition of spacers, on the outer surface of tubular body 99, and supporting for rotation a first and second tubular body 115 and 116, the first located over the second, and both coaxial with axis 47*a* and axially fixed in relation to tubular body 99. Tubular bodies 115 and 116 are connected angularly to each other by a torque limiting device 117 with permanent connecting magnets 118, the top one of which is connected to the bottom end of body 115 by a collar 119, the axial position of which in relation to tubular body 115, and hence to tubular body 116, is adjustable by means of a lock pin 120 for adjusting the maximum torque transmitted by device 117.

Body 115 is housed entirely inside bell 76, and presents, close to the top end, an outer radial pin 121 engaging in sliding manner an axial slot 122 formed along a cylindrical sleeve 123 coaxial with axis 47*a* and integral with bell 76. Sleeve 123 extends downwards from wall 77, and houses a top portion of body 115 to which it is connected angularly by means of a splined joint 123*a* (FIG. 5) to enable body 115 to move axially in relation to bell 76 by an amount substantially equal to the length of slot 122. The outer surface of body 115 is fitted in axially adjustable manner with a plate 124 located beneath the bottom end of sleeve 123 and supporting a helical spring 125 coaxial with axis 47*a* and compressed between plate 124 and the bottom surface of wall 77.

In other words, body 115 slides axially in relation to bell 76 and towards wall 77 in opposition to spring 125; is rotated with bell 76 by virtue of joint 123*a;* and transmits the rotation of bell 76 to body 116 via device 117 when the resisting torque applied to body 116 is below a value adjustable within a given range.

The bottom end of body 116 presents a cylindrical face cavity 126 housing a top portion of head 100 and communicating laterally with the outside through three radial slots 127 (only one shown) equally spaced about axis 47*a* and fitted through with respective pins 128 perpendicular to axis 47*a*. Each jaw 86 of gripping device 84 consists of a rocker arm comprising a first end second arm 129 and 130 located the first over the second and made integral with each other by a transverse appendix 131 extending inside a respective slot 127 and pivoting on a respective pin 128. The top portion of each arm 129 is bent outwards, and presents a through hole in which is locked a ball device 132 for contact of arm 129 with the bottom annular surface 133 of ring 82. The bottom portion of each arm 130 is bent radially inwards, and is fitted in radially adjustable manner with a gripping element 134 cooperating with gripping elements 134 of the other jaws 86, for gripping ring nut 6 of cap 5.

The angular position of each jaw 86 about respective pin 128 is adjusted positively by a respective tappet roller 135 forming part of drive 89 together with cam body 96. Roller 135 is positioned contacting cam surface 97 of cam body 96, and is supported for rotation on a respective pin 136 fitted obliquely to respective arm 130. For any axial position of cam body 96, contact between each roller 135 and surface 97 is assured by elastic device 88 which, for each jaw 86, comprises a cup-shaped body 137 housed in sliding manner—with its concavity facing inwards and its bottom wall contacting a supporting pad 138 on respective arm 129—inside a further cup-shaped body 139 housed—with its concavity facing outwards—inside a respective radial hole formed in body 116. A spring 140 is compressed between bodies 137 and 139, for pushing body 137 outwards against respective pad 138 and so imparting a closing torque to respective jaw 86 for maintaining respective roller 135 permanently contacting surface 97.

Before going on to describe the operation of capping unit 1 as a whole, some explanation should first be given of the operation of capping head 63 alongside rotation of respective assembly 60 about axis 11, and a variation in the position of shaft 64 in relation to shaft 61.

Upon drum 56 being rotated about axis 11 by motor 57, engagement of each pinion 69 with fixed ring gear 71 produces a rotation of respective shaft 61 about axis 47*a* and in relation to respective shaft 64 which is maintained angularly fixed in relation to drum 56 by respective antirotation roller 75. By means of bell 76 and joint 123*a,* each shaft 61 rotates respective drive 90 about axis 47*a* and in relation to drive 89, thus rotating gripping device 84 in relation to device 83 which is angularly integral with drive 89 and shaft 64 and hence with drum 56. The rotation of drive 90 in relation to drive 89 permits gripping device 83 to clamp respective nozzle 9 in relation to drum 56, and gripping device 84 to rotate ring nut 6 in relation to nozzle 9 and so screw ring nut 6 to neck 4 of respective container 3. Rotation of gripping device 84 obviously continues until ring nut is screwed completely on to neck 4 of respective container 3, and until the resisting torque applied to device 84 exceeds such a value as to disconnect tubular body 116 from tubular body 115 at torque limiting device 117. When this occurs, body 116 is arrested in relation to drive 89, whereas body 115 continues rotating about axis 47*a* together with bell 76.

When head 63 is in the open position shown in FIG. 5, shaft 64 is set to the lowest position in relation to shaft 61 so as to maintain pin 121 contacting the bottom end of slot 122, and also compress spring 104 to bring the top end of shaft 91 into an intermediate position between wall 77 and top surface 102 of tubular body 99.

Together with the end of slot 122, pin 121 constitutes a contrast device for preventing tubular body 115, and with it tubular body 99, from withdrawing from bell 76 when shaft 64 moves down in relation to shaft 61, and for enabling spring 104 to both support shaft 64 on shaft 61 and be compressed by said downward movement of shaft 64.

The lowered position of shaft 91 as described above also corresponds to a lowered position of head 93 in relation to head 100, and a lowered position of cam body 96. More specifically, in this position, head 93 presents the portion projecting from cam body 96 only partly housed inside cavity 101 of head 100.

With reference to FIG. 7, the lowered position of head 93 corresponds to a lowered position of groove 109 in relation to head 100 and, hence, a lowered position of pins 108 which, when moved downwards by head 93 in relation to head 100, provide for parting arms 110 of jaws 85 of gripping device 83.

With reference to FIG. 5, upon cam body 96 moving into the lowered position a given distance from the bottom end of tubular body 116, tappet rollers 135 cooperate with the widest part of surface 97 of body 96, so as to move arms 130 of jaws 86 of gripping device 84 outwards and in opposition to springs 140.

In other words, body 96 acts as a wedge movable axially between jaws 86 for moving them to and from the parted position.

When head 63 is in the closed position shown in FIG. 6, shaft 64 is set to the highest position in relation to shaft 61, so that the top end of shaft 91 is substantially coplanar with the bottom end of shaft 61, and plate 105 contacts the inner surface of wall 77. The raised position of shaft 91 described above normally corresponds to a lowered position of pin 121 contacting the bottom end of slot 122 as shown in FIG. 5. As explained in more detail later on, pin 121 only moves upwards along slot 122 into the intermediate position shown in FIG. 6 upon head 63 interacting with a container 3 on flange 44.

The raised position of shaft 91 described above also corresponds to a substantially distended position of spring 104, a raised position of head 93 in relation to head 100, and a raised position of cam body 96. More specifically, in this position, head 93 is positioned by spring 104 with the portion projecting from cam body 96 housed entirely inside cavity 101 of head 100 and contacting the bottom surface of the cavity.

With reference to FIG. 8, the raised position of head 93 contacting the bottom surface of cavity 101 corresponds to a raised position of groove 109 in relation to head 100 and, hence, a raised position of pins 108 which, when moved upwards by head 93 in relation to head 100 and by spring 104, move arms 110 of jaws 85 of gripping device 83 towards each other, so as to bring respective gripping elements 112 substantially into contact with each other, with a closing force proportional to the upward thrust imparted by spring 104 to shaft 91.

With reference to FIG. 6, upon cam body 96 moving into the raised position substantially contacting the bottom end of tubular body 116, tappet rollers 135 are slid by springs 140 along surface 97 and beneath cam body 96, and arms 130 of jaws 86 of gripping device 84 are brought together inwards, rotating in opposite directions about respective pins 128, so as to close gripping elements 134 on to ring nut 6 with a force proportional to the torque imparted by springs 140 to jaws 86. The inward movement of arms 130 is accompanied by an outward movement of arms 129 of jaws 86 and a simultaneous movement of ball devices 132 towards the outer periphery of surface 133.

Operation of capping unit 1 will now be described with special reference to FIG. 4, and as of when a container 3 and respective cap 5 are fed, one over the other, by conveyor 13 towards carrousel conveyor 10 along respective channels 32 and 33. As they are fed towards conveyor 10, container 3 and respective cap 5 approach station 12 simultaneously with a capping assembly 60 which is located close to position A in FIG. 4 and at the same distance from station 12 as respective container 3 and cap 5.

Assembly 60 is moved towards station 12 as a consequence of drum 56 being rotated about its axis 11 by motor 57; and, as it travels transversely to its axis 47*a* about axis 11, assembly 60 is rotated continuously about axis 47*a* by pinion 69 meshing with ring gear 71.

Figure 4:
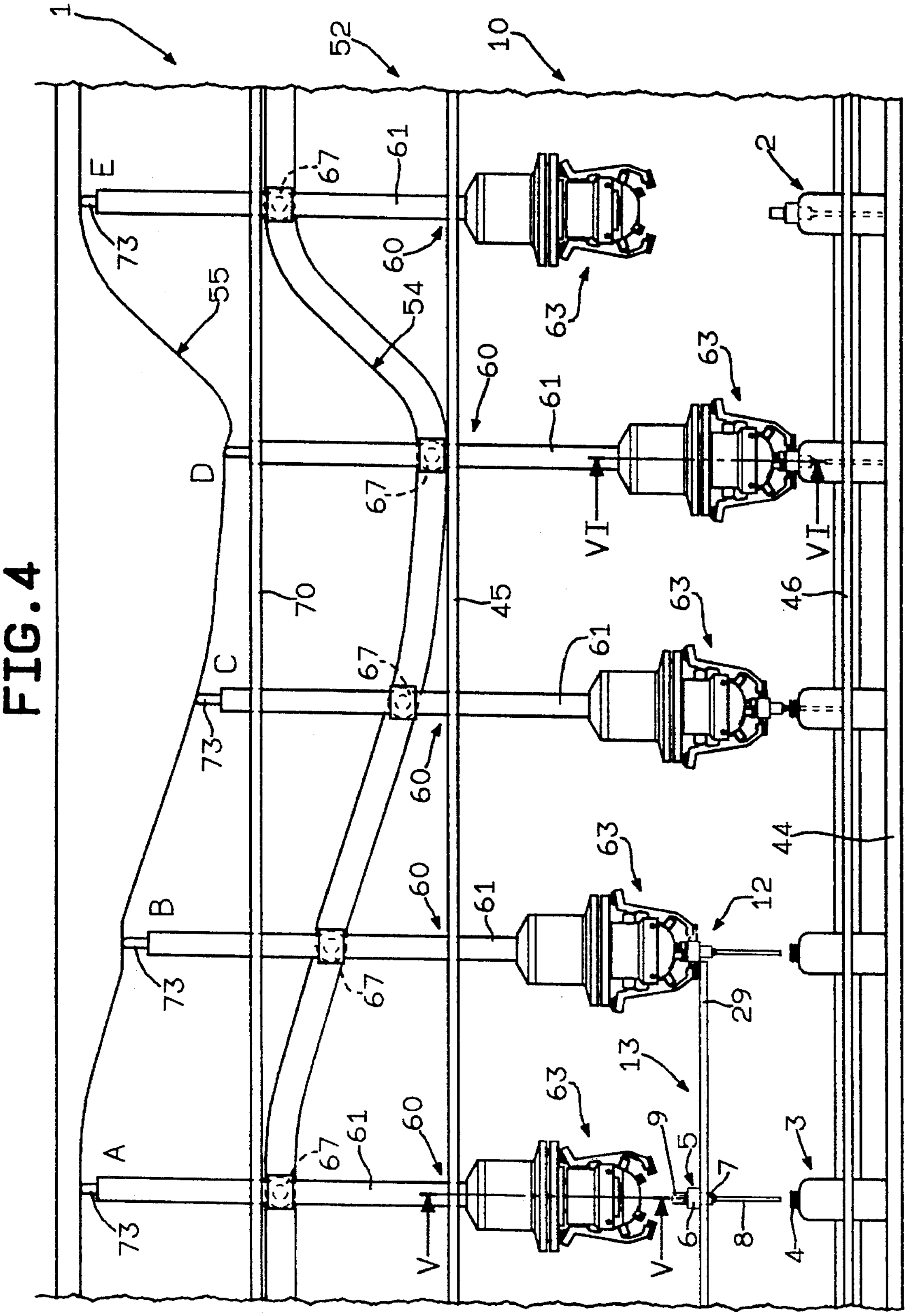
FIG. 4 shows a spread-out side view of the FIG. 3 detail with parts removed for clarity.

As it approaches position A in FIG. 4, assembly 60 travels along substantially horizontal portions of groove 54 and shoulder 55. More specifically, and as shown on the left in FIG. 3, said horizontal portions constitute the parts of groove 54 and shoulder 55 furthest away from flange 44, and (FIG. 4) are located a minimum distance apart so that (FIG. 5) shaft 64 is maintained in the lowered position in relation to shaft 61, corresponding, as already explained, to the open position of gripping devices 83 and 84.

Between position A and position B at station 12, assembly 60 first travels along equally downward-sloping portions of groove 54 and shoulder 55; which sloping portions maintain shaft 64 axially fixed in relation to shaft 61, and at the same time move the whole of assembly 60 downwards so that respective gripping elements 112 are positioned on either side of nozzle 9 of respective cap 5, and gripping elements 134 surround ring nut 6 of cap 5. As of this position, shaft 61 is maintained at a constant level over a relatively short portion of groove 54, after which it again moves down substantially steadily; whereas shaft 64 is maintained at a constant level over a longer portion of shoulder 55, after which it too again moves down in the same manner as shaft 61. The difference in the length of the two constant level portions of groove 54 and shoulder 55 causes shaft 64, at station 12, to move into the raised position in relation to shaft 61, thus closing gripping devices 83 and 84 about cap 5 which is gripped by respective capping assembly 60, removed from input conveyor 13, and fed along the circular path defined by conveyor 10, together with respective container 3 and coaxially with container 3 along respective axis 47*a*.

Between position B and position D wherein cap 5 is assembled on to respective container 3, assembly 60 travels along equally downward-sloping portions of groove 54 and shoulder 55; which sloping portions maintain shaft 64 axially fixed in relation to shaft 61, and hence gripping devices 83 and 84 in the closed position about cap 5, and at the same time move the whole of assembly 60 downwards so that suction tube 8 penetrates inside container 3 (position C) and ring nut 6 axially engages the end of the thread on neck 4 of container 3.

In connection with the above, it should be pointed out that, until ring nut 6 engages neck 4 of container 3, gripping devices 83 and 84 of head 63 of assembly 60 remain in the closed position, and pin 121 of head 63 remains contacting the bottom end of slot 122.

As of a position between positions C and D, the slope of groove 54 and shoulder 55 gradually lessens until it eventually levels out at assembly position D. Nevertheless, to enable capping unit 1 to adapt to containers 3 with necks 4 of different lengths and external threads, the downward movement imparted to assembly 60 by groove 54 upstream from position D is normally faster than the speed with which ring nut 6 is fitted on to neck 4 of container 3 as a result of head 63 being rotated continuously by coupling 69–71. Consequently, upon ring nut 6 contacting the thread of neck 4 of container 3, container 3 pushes the two drives 89 and 90 upwards into the FIG. 6 position, thus detaching pin 121 from the bottom of slot 122 in opposition to spring 125; and, upon the slope of groove 54 leveling out, drives 89 and 90 are moved downwards by spring 125, so as to screw ring nut 6 completely on to neck 4 of container 3 and so complete assembly of bottle 2 at position D.

In other words, spring 125 acts as an elastic compensating member for compensating between the downward speed of head 63 due to the slope of groove 54, and the downward speed of ring nut 6 in relation to neck 4 as a result of head 63 rotating about respective axis 47*a*.

Upon ring nut 6 being screwed completely on to neck 4, the resisting torque applied to drive 90 increases sharply, thus opening device 117 and arresting gripping device 84.

Immediately downstream from position D, groove 54 begins climbing until it eventually reaches, at position E, the same level as at position A; whereas shoulder 55 presents a sharp drop prior to climbing parallel to groove 54 until it too eventually reaches, at position E, the same level as at position A. The sharp drop in shoulder 55 results in a sharp downward movement of shaft 64 in relation to shaft 61, thus rapidly opening gripping devices 83 and 84 so that assembled bottle 2 is released by head 63.

Gripping devices 83 and 84 therefore permit head 63 to positively engage both nozzle 9 and ring nut 6 of cap 5, and to transmit to ring nut 6 a rotational movement with absolutely no sliding or rolling friction between drive 90 and ring nut 6.

Figure 9:
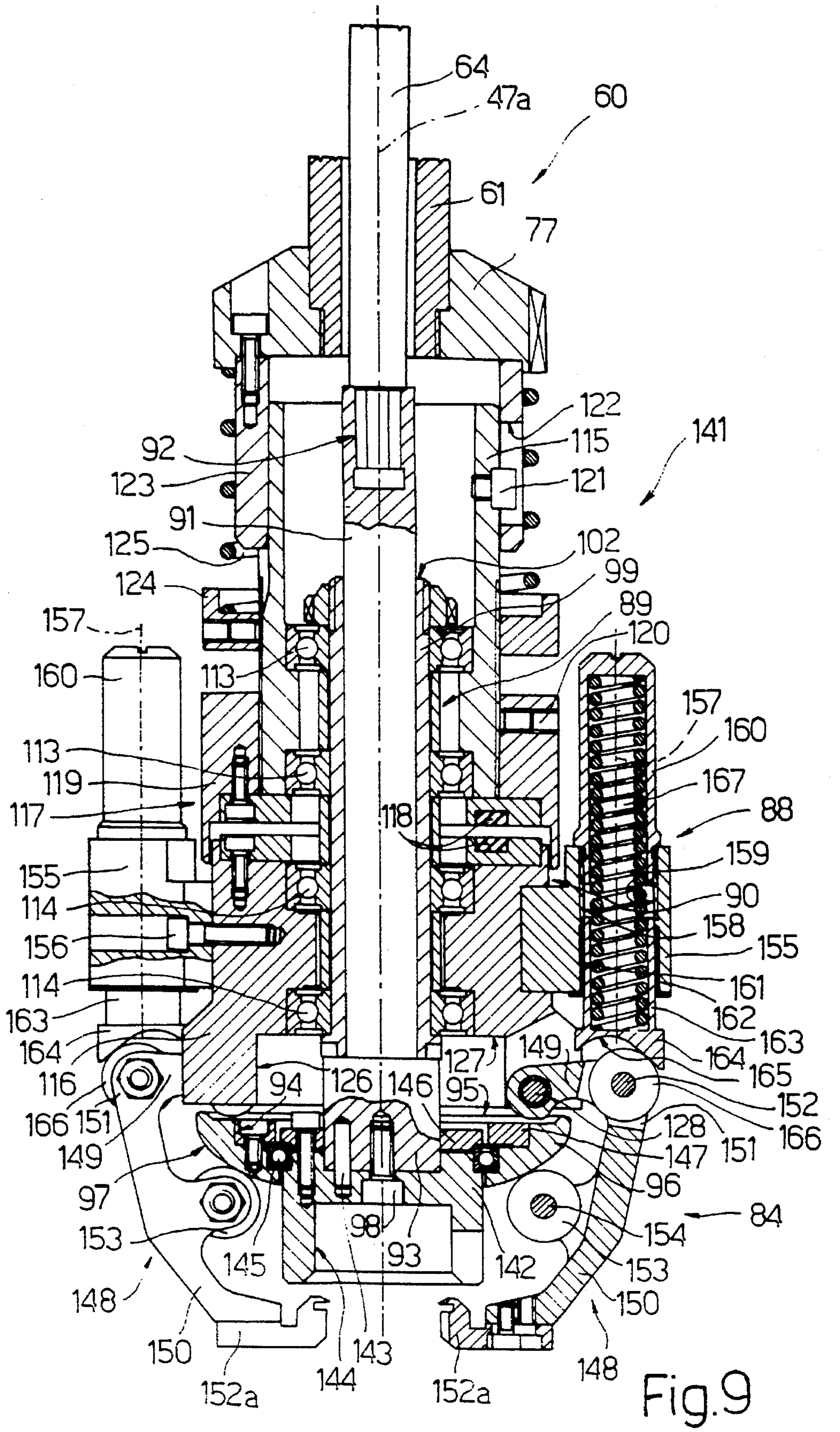
FIG. 9 is similar to FIG. 6, and shows an axial section of a variation of the FIG. 6 detail.

The FIG. 9 variation relates to a capping head 141, the parts of which structurally and/or functionally similar to those of head 63 are indicated using the same numbering system.

The main difference between heads 141 and 63 lies in gripping device 83 of head 63 being replaced by a clamping element 142 performing the same functions as device 83 but without jaws 85 and the elastic device 87 by which device 83 is maintained normally closed.

More specifically, element 142 is a tubular element fitted angularly to head 93 of shaft 91 by means of screw 98 and an antirotation pin 143, and presents a downwardly-open cylindrical cavity 144 for engaging nozzle 9 of cap 5. Also, element 142 supports cam body 96 in rotary manner via the interposition of a bearing 145 locked by two rings 146 and 147 respectively integral with element 142 and body 96 which, on head 63, was fitted directly to head 93 by means of screw 98.

As shown in FIG. 9, head 141 also presents gripping device 84 for engaging ring nut 6 of cap 5 and rotating it about axis **47*a*; and elastic device 88 for maintaining device 84 normally closed. Device 84 of head 141, however, differs substantially from that of head 63, and comprises three jaws 148 which, as opposed to rocker jaws as on head 63, are L-shaped, are equally spaced about axis 47*a*, and are moved between a closed operating position and an open position in opposition to elastic device 88 and by drive 89 controlled by drive shaft 64**.

Each jaw 148 consists of a lever comprising a first and second arm 149 and 150. Arm 149 is positioned substantially radially in relation to axis **47*a*, and presents one end pivoting on pin 128 through respective slot 127; while arm 150 extends downwards from the opposite end of arm 149 to that pivoting on pin 128, and is connected to arm 149 via the interposition of a toggle element 151 supporting a respective pin 152 perpendicular to axis 47*a*. The bottom portion of each arm 150 is bent radially inwards, and is fitted in radially adjustable manner with a gripping element 152*a* cooperating with the gripping elements 152*a* of the other jaws 148 to grip ring nut 6 of cap 5**.

The angular position of each jaw 148 about respective pin 128 is adjusted positively by cam body 96 via the interposition of a roller 153 contacting surface 97 of cam body 96 and supported for rotation on a respective pin 154 fitted transversely to an intermediate portion of respective arm 150.

For any axial position of cam body 96, contact between each roller 153 and surface 97 is assured by elastic device 88 which, for each jaw 148, comprises a sleeve 155 fitted to the periphery of bottom tubular body 116 by means of a respective screw 156, and coaxial with an axis 157 parallel to axis **47*a*. Sleeve 155 presents a through axial hole 158, the top portion 159 of which is threaded and engaged by the threaded outer end of a downwardly-concave cup-shaped body 160; and the bottom portion 161 of which is engaged by a tubular body 162 housing in sliding manner an upwardly-concave cup-shaped body 163. Body 163 presents a bottom wall 164, the outer saddle-shaped surface 165 of which cooperates with a roller 166 supported for rotation on pin 152 of jaw 148. Elastic device 88 also comprises a helical spring 167 coaxial with axis 157, compressed between bodies 160 and 163, and which provides for pushing body 163 outwards of hole 158 and hence surface 165 of wall 164 against respective roller 166, and so imparting to respective jaw 148 a closing torque for maintaining respective roller 153 permanently contacting surface 97**.

The above axial arrangement of springs 167 on head 141 provides for eliminating lateral wall 78, flange 79 and face ring 82 of bell 76 on head 63.

Operation of head 141 is easily deducible from that of head 63 and therefore requires no further description.

We claim:

1. A capping unit for assembling pump-operated spray cap bottles that each include a container with an externally threaded neck and a pump-operated cap having a nozzle and an internally threaded ring nut fitted to the nozzle so as to rotate about a first axis; the capping unit comprising:

(a) first engaging means moveable into an engagement position with the ring nut of a pump-operated spray cap, for engaging the ring nut and rotating the ring nut about the first axis;

(b) second engaging means moveable into an engagement position with the nozzle of a pump-operated spray cap for engaging the nozzle; and (c) first drive means for rotating the first engaging means about the first axis to rotate the ring nut with respect to the nozzle.

2. The capping unit of claim 1, in which the first drive means continuously rotates the first engaging means.

3. The capping unit of claim 1 which further comprises:

(a) a first shaft coaxial with and rotatable about the first axis, the first drive means being interposed between the first shaft and the first engaging means, for rotating the first engaging means about the first axis;

(b) a second shaft movable axially in relation to the first shaft; and (c) second drive means controlled by the second shaft, for moving both the first and second engaging means to and from their respective engagement positions.

4. The capping unit of claim 3, wherein the second engaging means comprises a tubular clamping element defining a cavity for receiving and angularly locking, in relation to the second shaft, the nozzle of a cap.

5. The capping unit of claim 1 wherein the first engaging means comprises a first gripping device coaxial with the first axis, said first gripping device being movable to and from the engagement position of the first engaging means.

6. The capping unit of claim 5 which further comprises a carrousel conveyor having a central drum rotatable about a second axis, the first and second engaging means being supported on the drum so as to rotate with the drum about the second axis; the first and second engaging means being axially movable along the second axis to and from their engagement positions.

7. The capping unit of claim 6, wherein the second shaft, the second drive means and the second engaging means are angularly integral with one another; and further comprising lock means associated with the second shaft, for angularly locking the second shaft in relation to the drum.

8. The capping unit of claim 7, wherein the gripping device is a normally-closed device and comprises jaws arranged about the first axis and elastic means interposed between the first drive means and the jaws, for pushing the jaws into a closed position corresponding to the engagement position.

9. The capping unit of claim 8, wherein the second drive means comprises a head movable with the second shaft along the first axis, and a wedge element movable along the first axis with said movable head, for parting the jaws of the gripping device in opposition to the elastic means.

10. The capping unit of claim 9, wherein said wedge element is mounted for rotation about the first axis.

11. The capping unit of claim 9, wherein the first drive means comprises first and second tubular bodies, and a torque limiting device interposed between said first and second tubular bodies, said first tubular body being angularly integral with the first shaft, and said second tubular body supporting the jaws of the gripping device.

12. The capping unit of claim 9, which further comprises axial damping and compensating means interposed between the first drive means and the first shaft.

13. The capping unit of claim 5, wherein the second engaging means comprises a second gripping device coaxial with the first axis and movable to and from the engagement position with respect to the nozzle of the cap, and which further comprises a first shaft coaxial with and rotatable about the first axis, the first drive means being interposed between said first shaft and the first gripping device, for rotating the first gripping device about the first axis, a second shaft movable axially in relation to the first shaft, and second drive means controlled by said second shaft, for moving both the first and second gripping devices to and from their respective engagement positions.

14. The capping unit of claim 13, wherein the second gripping device is a normally-closed device, and comprises jaws arranged about the second axis, and second elastic means for pushing the jaws of the second gripping device into a closed position corresponding to the engagement position with respect to the nozzle.

15. The capping unit of claim 14 wherein the second drive means further comprises a first head substantially fixed, along the first axis, in relation to the first shaft, and a second head movable with the second shall along the first axis, the second elastic means being interposed between the first head and the second head, and each jaw of the second gripping device being pivotable on said first head and being connected to said second head so as to rotate about its pivot from the closed position upon said second head, and being movable in relation to said first head in opposition to the second elastic means.

16. The capping unit of claim 15, wherein the second drive means further comprises a wedge element movable along the first axis with the second head and in opposition to the second elastic means, for parting the jaws of the first gripping device in opposition to the first elastic means.

17. The capping unit of claim 15, wherein each jaw of the second gripping device comprises at least two L-shaped gripping elements, said gripping elements cooperating mutually to define a substantially closed collar about the nozzle when the respective jaws are closed.

* * * * *

UNITED STATES PATENT AND TRADEMARK OFFICE
CERTIFICATE OF CORRECTION

PATENT NO. : 5,467,527
DATED : November 21, 1995
INVENTOR(S) : G. Zanini et al.

It is certified that error appears in the above-indentified patent and that said Letters Patent is hereby corrected as shown below:

| COLUMN | LINE | |
|---|---|---|
| [54] (pg. 1, col. 1) | Title (line 3) | "CAP" should read --CAP BOTTLES-- |
| 1 | 3 | "CAP" should read --CAP BOTTLES-- |

Signed and Sealed this

Second Day of April, 1996

Attest:

Bruce Lehman

BRUCE LEHMAN

*Attesting Officer* *Commissioner of Patents and Trademarks*